United States Patent [19]

Suh

[11] 3,894,051

[45] July 8, 1975

[54] N-METHYLENEDIOXYPHENYLALKYL)-β-(ALKYL)-DISUBSTITUTED PHENETHYLAMINES

[75] Inventor: John T. Suh, Mequon, Wis.

[73] Assignee: Colgate-Palmolive Company, New York, N.Y.

[22] Filed: July 5, 1973

[21] Appl. No.: 376,686

[52] U.S. Cl. ........ 260/340.5; 260/459; 260/501.18; 260/567.6 M; 260/570.5 CA; 260/570.8 R; 424/282
[51] Int. Cl. ............................................ C07d 13/10
[58] Field of Search .................. 260/340.5; 424/282

[56] References Cited
UNITED STATES PATENTS
3,700,692  10/1972  Suh et al. ......................... 260/340.5

*Primary Examiner*—V. D. Turner
*Attorney, Agent, or Firm*—T. F. Kryshak; M. L. Youngs

[57] ABSTRACT

The compounds are N-substituted-dihydroxyphenethylamines which are cardiotonic agents, central nervous system depressants and analgetic agents. Representative of the compounds disclosed are N-(3,4-methylenedioxyphenisobutyl)-β-(isopropyl)-3,4-dihydroxyphenethylamine and N-(3,4-methylenedioxyphenisopropyl)-β-(isopropyl)-3,4-dihydroxyphenethylamine.

9 Claims, No Drawings

N-METHYLENEDIOXYPHENYLALKYL)-β-(ALKYL)-DISUBSTITUTED PHENETHYLAMINES

BACKGROUND OF THE INVENTION

α-(3,4-Dihydroxyphenyl)-β-(N-3',4'-methylenedioxyphenyl)-alkylamino ethanols are disclosed in U.S. Pat. No. 3,139,441, and 1-(4'-hydroxy-3'-(hydroxymethyl)-phenyl)-1-hydroxy-2-aralkylaminoethanes are disclosed in U.S. Pat. No. 3,700,692.

DETAILED DESCRIPTION

The compounds of the present invention may be represented by the following formula:

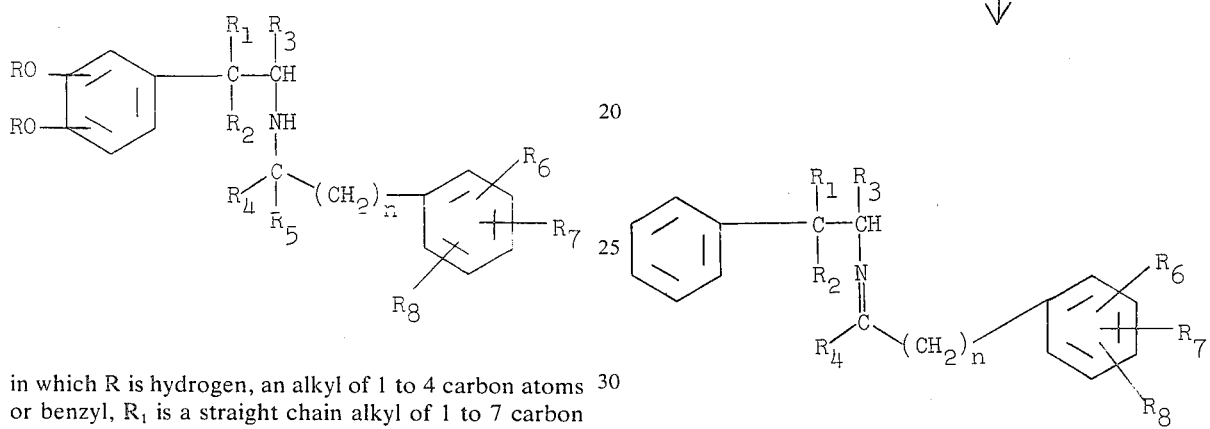

in which R is hydrogen, an alkyl of 1 to 4 carbon atoms or benzyl, $R_1$ is a straight chain alkyl of 1 to 7 carbon atoms, a branched chain alkyl of 3 to 7 carbon atoms, such as isopropyl, s-butyl or t-butyl or a cycloalkyl of 3 to 7 carbon atoms such as cyclopropyl or cyclobutyl, $R_2$, $R_3$ and $R_4$ are hydrogen or lower alkyl of 1 to 4 carbon atoms, $R_5$ is a lower alkyl of 1 to 4 carbon atoms, $R_6$, $R_7$ and $R_8$ are hydroxy, lower alkoxy of 1 to 4 carbon atoms, a halogen such as chloro, bromo or fluoro, trifluoromethyl or $R_6$ and $R_7$ together are methylenedioxy and $n$ is 1, 2 or 3.

The preferred method of preparing the compounds is illustrated by the following, which is a description of the preparation of N-(3,4-methylenedioxyphenisobutyl)-β-(isopropyl)-3,4-dihydroxyphenethylamine hydrochloride. A solution containing β-iso-propyl-3,4-dibenzyloxyphenethylamine and 4-(3,4-methylenedioxyphenyl)-butan-2-one in anhydrous benzene is heated at reflux for about 2 hours, at which time the solution is concentrated. The thus obtained product is dissolved in ethanol and treated with sodium borohydride to yield the compound N-(3,4-methylenedioxyphenisobutyl)-β-(isopropyl)-3,4-dibenzyloxyphenethylamine. The thus obtained dibenzyloxy derivative is then hydrogenated in the presence of a suitable catalyst such as 5% palladium on carbon to form the desired amine. A similar process may be employed utilizing different appropriate amines and aldehydes or ketones to produce other compounds falling within the scope of the invention.

The preferred process of preparing the compounds may be illustrated as follows:

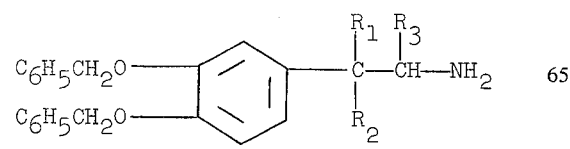

+

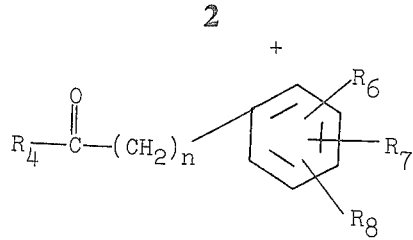

↓

↓ $NaBH_4$

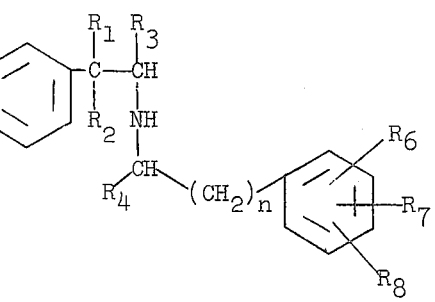

↓ $H_2$/catalyst

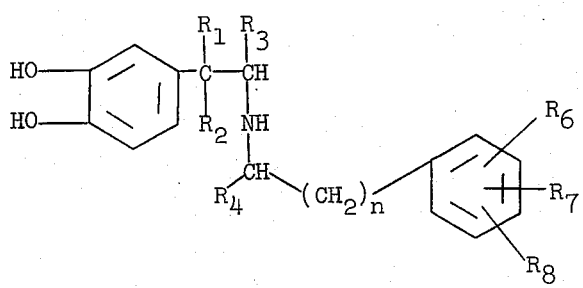

in which all symbols are as previously defined.

Among the compounds that may be prepared by the described process are the following:

N-(3,4-methylenedioxyphenisobutyl)-β-(isopropyl)-3,4-dihydroxyphenethylamine,

N-(3,4-methylenedioxyphenisopropyl)-β-(3,4-dihydroxyphenyl)-β-(isopropyl)-ethylamine, N-(3,4-methylenedioxyphenisobutyl)-β-(t-butyl)-3,4-dihydroxyphenethylamine, N-(3,4-methylenedioxyphenisobutyl)-β-(ethyl)-3,4-dihydroxyphenethylamine, N-(3,4-methylenedioxyphenisopentyl)-β-(isopropyl)-3,4-dihydroxyphenethylamine, N-(α,α-dimethyl-3,4-methylenedioxyphenpropyl)-β-(isopropyl)-3,4-dihydroxyphenethylamine, N-(α,α-dimethyl-3,4-methylenedioxyphenpropyl)-β-(t-butyl)-3,4-dihydroxyphenethylamine, N-(3,4-methylenedioxyphenisobutyl)-β-(cyclopropyl)-3,4-dihydroxyphenethylamine, N-(3,4-methylenedioxyphenisobutyl)-β-(cyclobutyl)-3,4-dihydroxyphenethylamine, N-(3,4-methylenedioxyphenisobutyl)-β-(t-butyl)-3,4-dibenzyloxyphenethylamine, N-(3,4-methylenedioxyphenisobutyl)-β-(isopropyl)-3,4-dimethoxyphenethylamine, N-(α,α-dimethyl-3,4-methylenedioxyphenpropyl)-β-isopropyl-3,5-dihydroxyphenethylamine, N-(α,α-dimethyl-3,4-methylenedioxyphenpropyl)-β,β-dimethyl-3,4-dihydroxyphenethylamine, N-(α,α-dimethyl-3,4-methylenedioxyphenpropyl)-β-(isopropyl)-3,4-dihydroxyphenethylamine, N-(3,4,5-trimethoxyphenisobutyl)-β-(isopropyl)-3,4-dihydroxyphenethylamine, N-(α,α-dimethyl-3,4-dimethoxyphenpropyl)-β-(isopropyl)-3,4-dihydroxyphenethylamine, N-(3,4-dichlorophenisobutyl)-β-(isopropyl)-3,4-dihydroxyphenethylamine, N-(4-trifluoromethylphenisobutyl)-β-(isopropyl)-3,4-dihydroxyphenethylamine, N-(4-hydroxyphenisobutyl)-β-(isopropyl)-3,4-dihydroxyphenethylamine, N-(3,4-dihydroxyphenisobutyl)-β-(isopropyl)-3,4-dihydroxyphenethylamine, N-(2,3-methylenedioxyphenisobutyl)-β-(isopropyl)-3,4-dihydroxyphenethylamine, N-(4-fluorophenisobutyl)-β-(isopropyl)-3,4-dibenzyloxyphenethylamine, and N-(3,4-dimethoxyphenisobutyl)-β-(t-butyl)-3,4-dimethoxyphenethylamine.

The novel compounds of the present invention are useful as pharmaceutical agents because of their central nervous system depressant activity, their analgetic activity and their cardiotonic activity. The compounds are especially interesting as cardiotonic agents or for the treatment of shock. For example, in tests involving dogs, the compound N-(3,4-methylenedioxyphenisobutyl)-β-(isopropyl)-3,4-dihydroxyphenethylamine hydrochloride was found, when administered intravenously at a dose of 0.3 mg/kg, to increase the contractile force of the heart selectively without influencing the blood pressure or heart rate of the animal.

In animal behavioral tests the above-mentioned compound exhibited a central nervous system depressant activity. In mice receiving 30 mg/kg of the compound intraperitoneally in the form of a 5% acacia suspension, decreased alertness, reactivity, struggle response and other behavioral characteristics of central nervous system depression were observed. As a result of the behavioral studies, the compound was found to have $LD_{50}$ values in excess of 55 mg/kg. The behavioral studies were conducted in accordance with the procedure set forth by Irwin in "Animal and Clinical Pharmacologic Techniques in Drug Evaluation", J. H. Nodine and P. E. Seigler, Ed., Year Book Publishers, Inc., 1964, pp. 36–54.

Acid addition salts of the compounds of the present invention may be conveniently prepared by contacting the compounds which are capable of forming such salts with a suitable acid such as formic acid, citric acid, maleic acid, sulfuric acid, hydrochloric acid, succinic acid, tartaric acid, benzoic acid or fumaric acid.

Quaternary ammonium salts may be formed by contacting the salt-forming compounds with a suitable alkylating agent such as dimethyl sulfate, or an alkyl halide such as methyl chloride, methyl iodide or ethyl bromide.

When intended for use as pharmaceutical agents, the compounds are preferably combined with a major amount of one or more suitable pharmaceutical diluents and formed into unit dosage forms. Such dosage forms provide suitable means for oral and parenteral administration.

The pharmaceutical diluents which may be employed may be either liquid or solid, but the preferred liquid carrier is water. In the event the compounds are not soluble in water, a pharmaceutically acceptable organic solvent such as propylene glycol may be employed.

Solid pharmaceutical diluents such as starch, sugar and talc can be utilized to form powders which can in turn be used as such or may be tableted or encapsulated. In addition to the forementioned material, a wide variety of conventional pharmaceutical lubricants, disintegrating agents, flavoring agents and the like may also be employed.

The unit dosage forms may contain a concentration of 0.1 to 10% or more by weight of one or more of the novel compounds. Generally, such dosage forms will contain about 5 to 250 mg. of the active ingredients. One or more of such dosage forms may be administered daily. In actual practice, the amount of drug required to produce the desired effect will, of course, vary considerably because of patient differences.

The following examples are presented to illustrate this invention:

EXAMPLE 1

α-iso-Propylidene-3,4-dimethoxyphenyl-acetonitrile

To a solution of 12.54 g. (0.545 mole) of sodium in 900 ml. of ethanol is added 118 g. (0.632 mole) of 3,4-dimethoxyphenyl-acetonitrile in 5 minutes. The solution is heated to reflux in 0.25 hour and maintained 0.75 hour. It is then cooled to 22°, after which 106 ml. (1.45 moles) of acetone is added in 0.25 hour. The solution is stirred at 22° for 0.5 hour, heated to reflux in 0.5 hour, and maintained 4 hours. The solution is then diluted to 3.3 liters with water and extracted 3 times with ether. The combined extracts are washed successively with water and brine, dried and concentrated to yield an oil which is fractionated through a 6 inch 24/40 column to yield 76.1 g. of an oil which crystallizes, b.p. 135°–160°/0.3 mm. The material is recrystallized from 330 ml. of ethanol to yield 48.9 g. (41.3%) of α-iso-propylidene-3,4-dimethoxyphenyl-acetonitrile as white needles in two crops, 46.0 g., m.p. 95°–98°; 2.9 g., m.p. 93°–95°.

EXAMPLE 2

α-iso-Propyl-3,4-dimethoxyphenylacetonitrile

To a solution of 21.7 g. (0.1 mole) of α-iso-propylidene-3,4-dimethoxyphenylacetonitrile in 280 ml. of ethanol is added 0.75 g. of 10% palladium on carbon and the mixture is shaken with hydrogen (43.3 psi) until the theoretical amount of hydrogen (8.2 psi) has been taken up in 5 hours. The catalyst is removed by filtration and the filtrate reduced in vacuo to yield a clear group syrup which crystallizes upon standing. It is recrystallized from ethanol to yield 18.3 g. (84%) of α-iso-propyl-3,4-dimethoxyphenylacetonitrile as a white crystalline solid, m.p. 45.5°–49°.

Anal. Calcd. for $C_{13}H_{17}NO_2$: C, 71.18; H, 7.83; N, 6.39.

Found: C, 71.13; H, 7.73; N, 16.53.

EXAMPLE 3

α-iso-Propyl-3,4-dihydroxyphenylacetonitrile

A mixture of 13.9 g. (0.06 mole) of α-iso-propyl-3,4-dimethoxyphenylacetonitrile and 43.7 g. (0.38 mole) of pyridine hydrochloride is heated in an oil bath for 3.5 hours at 200°–220°. The clear solution is poured into 900 ml. of water, cooled, and the resulting solid collected and recrystallized from 40% isopropanol to yield 9.4 g. of α-isopropyl-3,4-dihydroxyphenylacetonitrile as a light brown crystalline solid, m.p. 134.5°–136°.

EXAMPLE 4

α-iso-Propyl-3,4-dibenzyloxyphenylacetonitrile

A mixture of 27.6 g. (0.144 mole) of α-iso-propyl-3,4-dihydroxyphenylacetonitrile, 41.3 ml. (0.456 mole) of α-chlorotoluene and 56.1 g. (0.406 mole) of potassium carbonate in 305 ml. of ethanol is refluxed for 5 hours. The mixture is then filtered while still hot. The filtrate is cooled, and the precipitated solid collected and washed with cold ethanol and then water. It is then dried to yield 46.7 g. of α-iso-propyl-3,4-dibenzyloxyphenylacetonitrile as a white solid, m.p. 75°–76°.

EXAMPLE 5

β-iso-Propyl-3,4-dibenzyloxyphenethylamine Hydrochloride

To 54 ml. (0.054 mole) of borane/tetrahydrofuran is added a solution of 20.0 g. (0.054 mole) of α-iso-propyl-3,4-dibenzyloxyphenylacetonitrile in 53 ml. of tetrahydrofuran in ten minutes while cooling the reaction in a cold water bath. The solution is then stirred at 22° for 22 hours, cooled and 25 ml. of ethanol added in 5 minutes and the solution then stirred 0.25 hour at 22°. The solution is then concentrated to a residual oil, and a solution of 6.55 g. (0.164 mole) of NaOH in 27 ml. of water added, heated to reflux in 0.5 hour and maintained for 1 hour. The mixture is cooled, diluted with water and extracted twice with ether. The combined extracts are washed twice with brine, dried and concentrated to yield a brown oil which is distilled through a stillhead to yield 9.2 g. of a light yellow oil. The material is dissolved in ether, acidified with ethereal HCl and diluted with n-heptane. The precipitated solid is collected and recrystallized from ethanol to yield 2.8 g. of β-iso-propyl-3,4-dibenzyloxyphenethylamine hydrochloride as a white solid, m.p. 151.5°–153°.

EXAMPLE 6

β-iso-Propyl-3,4-dihydroxyphenethylamine Hydrochloride

A mixture of 4.12 g. (0.01 mole) of β-iso-propyl-3,4-dibenzyloxyphenethylamine hydrochloride and 0.2 g. of 5% palladium on carbon in 100 ml. of methanol is shaken under hydrogen (50 psi) until the theoretical amount has been taken up in 4 hours. The catalyst is removed by filtration, and the filtrate concentrated to yield a grey glass. The product is dissolved in 30 ml. of ethanol, treated with activated charcoal, filtered and diluted to 240 ml. with ether. The gummy material which precipitates and then solidifies is collected and dried in vacuo at 65° to yield 2.01 g. of β-iso-propyl-3,4-dihydroxyphenethylamine hydrochloride as a light grey solid, m.p. 241°–245°.

EXAMPLE 7

N-(3,4-Methylenedioxyphenisobutyl)-β-(3,4-dibenzyloxyphenyl)-β-(isopropyl)ethylamine A solution of 9.1 g. (0.024 mole) of β-isopropyl-3,4-dibenzyloxyphenethylamine and 4.66 g. (0.024 mole) of 4-(3,4-methylenedioxyphenyl)-butan-2-one in 75 ml. of dried benzene is heated to reflux in 0.5 hour and maintained 1.5 hours, while collecting the water in a Dean Stark trap. The solution is cooled and concentrated at a low temperature to yield 14.8 g. of a viscous clear brown oil.

To a solution of the above oil in 50 ml. of ethanol is added 1.1 g. (0.029 mole) of $NaBH_4$ in 2 minutes while cooling. The mixture is stirred with cooling for 0.5 hour and at room temperature for 16 hours. It is then concentrated to yield a viscous oil to which 75 ml. of water is added with stirring. The mixture is then adjusted to acidity by the dropwise addition of 10% HCl solution, after which it is adjusted to basicity by the addition of 10% NaOH solution, and extracted twice with ether. The combined extracts are washed with brine, dried and concentrated to yield an oil which is chromatographed on 100 g. of Silica using 1.3 liters of 1:1 n-heptane/ether as eluent to yield 3.9 g. of N-(3,4-methylenedioxyphenisobutyl)-β-(3,4- dibenzyloxyphenyl)-β-(isopropyl)ethylamine as a clear viscous oil.

EXAMPLE 8

N-(3,4-Methylenedioxyphenisobutyl)-β-(3,4-dihydroxyphenyl)-β-(isopropyl)ethylamine hydrochloride A mixture of 3.9 g. of N-(3,4-methylenedioxyphenisobutyl)-β-(3,4-dibenzyloxyphenyl)-β-(isopropyl)ethylamine, and 0.5 g. of 5% palladium on carbon in 150 ml. of ethanol is adjusted to acidity by the addition of ethereal HCl. An additional 0.5 g. of 5% palladium on carbon is then added, and the mixture shaken under hydrogen (49.0 psi) until the theoretical amount has been taken up in 5.5 hours. The catalyst is removed and the filtrate concentrated to yield a white glass, which is redissolved in ethanol, treated with activated charcoal, filtered and concentrated at a low temperature. The residual glass is then dried in vacuo at 50°–60°, whereupon it darkens. It is then redissolved in ethanol, treated with activated charcoal, and concentrated at a low temperature. The flask containing the residual glass is then placed in a water bath heated at 50°–70° and dried under high vacuum to yield 2.1 g. of N-(3,4-methylenedioxyphenisobutyl)-β-(3,4-dihydroxyphenyl)-β-(isopropyl)-ethylamine hydrochloride as a white glass, m.p. >75°.

EXAMPLE 9

N-(3,4-Methylenedioxyphenisopropyl)-β-(3,4-dibenzyloxyphenyl)-β-(isopropyl)ethylamine A solution of 9.12 g. (0.0243 mole) of β-isopropyl-3,4-dibenzyloxyphenethylamine and 4.33 g. (0.0243 mole) of 3-[3,4-methylenedioxy)phenyl]-propan-2-one in 75 ml. of benzene is heated to reflux in 0.25 hour and maintained 4.75 hours, while collecting the water in a Dean Stark trap. The solution is cooled and concentrated to yield a residual oil.

To a solution of the above oil in 50 ml. of ethanol is added 1.105 g. (0.0292 mole) of NaBH₄ in 5 minutes while cooling. The solution is stirred at room temperature for 4.5 hours, after which it is concentrated. Water (50 ml.) is added to the oily residue followed by 50 ml. of 10% HCl solution. Chloroform (40 ml.) is then added and the mixture stirred until complete solution occurs. The aqueous layer is separated and extracted once more with chloroform. The combined organic solution is washed with brine, dried and concentrated to yield a viscous oil which is dissolved in ethanol, diluted with ether and washed with 10% NaOH solution. The organic layer is dried and concentrated to yield an oil which is chromatographed on 200 g. of Silica (4 × 40 cm.) using three liters of 1:1 Et₂O n-heptane as eluent to yield 7.3 g. of N-(3,4-methylenedioxyphenisopropyl)-β-(3,4-dibenzyloxyphenyl)-β-(isopropyl)ethylamine as a clear viscous oil.

EXAMPLE 10

N-(3,4-Methylenedioxyphenisopropyl)-β-(3,4-dihydroxyphenyl)-β-(isopropyl)ethylamine hydrochloride A solution of 8.5 g. (0.016 mole) of N-(3,4-methylenedioxyphenylisopropyl)-β-(3,4-dibenzyloxyphenyl)-β-(isopropyl)ethylamine in 175 ml. of ethanol is adjusted to acidity by the addition of ethereal HCl. A 1.2 g. portion of 5% palladium on carbon is then added, and the mixture shaken under hydrogen (49 psi) for 5 hours, whereupon uptake of hydrogen ceases. The mixture is filtered, and the filtrate concentrated at less than 60° to yield a glass which is then dried at 55°–65° at 0.01 mm. for 2.25 hours to yield 5.9 g. of N-(3,4-methylenedioxyphenisopropyl)-β-(3,4-dihydroxyphenyl)-β-(isopropyl)ethylamine hydrochloride as a grey glass and as a hemihydrate, m.p. 89°–102°.

I claim:
1. A compound of the formula

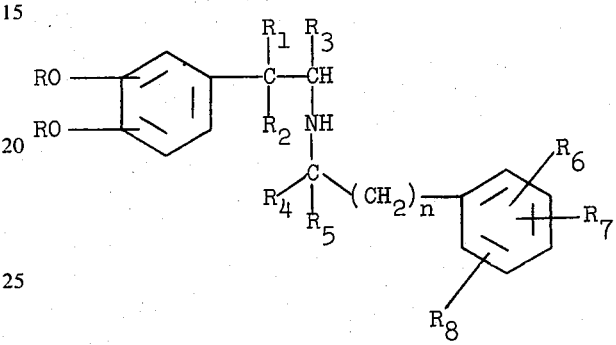

in which R is hydrogen, alkyl of 1 to 4 carbon atoms or benzyl, R₁ is straight chain alkyl of 1 to 7 carbon atoms, branched chain alkyl of 3 to 7 carbon atoms, or cycloalkyl of 3 to 7 carbon atoms, R₂, R₃ and R₄ are hydrogen or lower alkyl of 1 to 4 carbon atoms, R₅ is lower alkyl of 1 to 4 carbon atoms, R₈ is hydroxy, lower alkoxy of 1 to 4 carbon atoms, halogen or trifluoromethyl, R₆ and R₇ together are methylenedioxy and n is 1 or 2.

2. A compound of claim 1 in which R is hydrogen.
3. A compound of claim 1 in which R is benzyl.
4. A compound of claim 1 in which R₄ is methyl.
5. A compound of claim 1 in which R is isopropyl.
6. The compound of claim 1 which is N-(3,4-methylenedioxyphenisobutyl)-β-(isopropyl)-3,4-dihydroxyphenethylamine.
7. The compound of claim 1 which is N-(3,4-methylenedioxyphenisopropyl)-β-(isopropyl)-β-3,4-dihydroxyphenethylamine.
8. The method of preparing a compound of claim 1 which has the formula

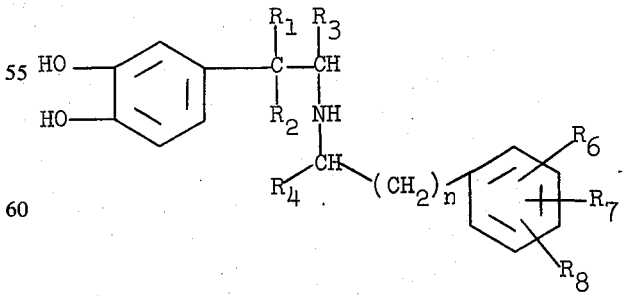

in which all symbols are as defined in claim 1, which comprises reacting a compound of the formula

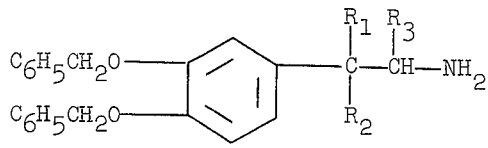

with a compound of the formula

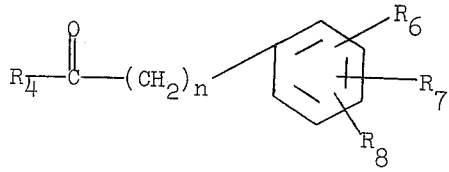

in anhydrous benzene at reflux to form a compound of the formula

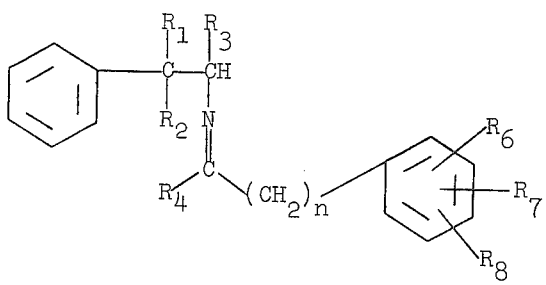

which is treated with sodium borohydride to form

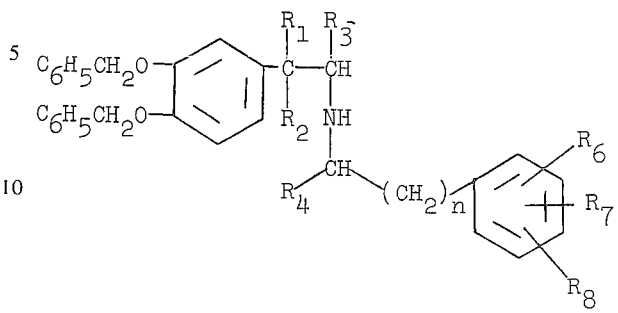

which is hydrogenated in the presence of a palladium catalyst to form the desired compound.

9. The method of preparing the compound of claim 1 which is N-(3,4-methylenedioxyphenisobutyl)-β-(isopropyl)-3,4-dihydroxyphenethylamine, which comprises reacting β-iso-propyl-3,4-dibenzyloxyphenethylamine with 4-(3,4-methylenedioxyphenyl)-butan-2-one in anhydrous benzene at reflux, adding sodium borohydride to form N-(3,4-methylenedioxyphenisobutyl)-β-(isopropyl)-3,4-dibenzyloxyphenethylamine and then hydrogenating that compound in the presence of a palladium catalyst to obtain the desired compound.

* * * * *